United States Patent [19]
Smith

[11] 3,742,382

[45] June 26, 1973

[54] APPARATUS FOR STABILIZING A LASER TO A GAS ABSORPTION LINE

[75] Inventor: Peter William Smith, Colts Neck, N.J.

[73] Assignee: Bell Telephone Laboratories, Incorporated, Murray Hill, N.J.

[22] Filed: Apr. 3, 1972

[21] Appl. No.: 240,479

[52] U.S. Cl. ............................................. 331/94.5
[51] Int. Cl. ............................................. H01s 3/10
[58] Field of Search ................................. 331/94.5

[56] References Cited
UNITED STATES PATENTS
3,471,804  10/1969  Bridges et al. .................. 331/94.5
3,537,027  10/1970  Smith ............................. 331/94.5

Primary Examiner—William L. Sikes
Attorney—R. J. Guenther and Arthur J. Torsiglieri

[57] ABSTRACT

There is disclosed a frequency-stabilized laser in which a first component of the output beam is passed through a gaseous frequency standard cell in a first direction and then detected while a second component of the beam is passed through the cell in a second direction slightly less than 180° from the first direction so as to avoid subsequent interaction with the apparatus. The detected signal as a function of frequency has a narrow peak centered on the absorption line of the gas. The width of this peak is the homogeneous linewidth of the absorbing gas, which is typically much narrower than the Doppler-broadened absorption line. The detected signal is applied through a feedback loop to control the tuning of the laser resonator.

2 Claims, 3 Drawing Figures 3,742,382

APPARATUS FOR STABILIZING A LASER TO A GAS ABSORPTION LINE

BACKGROUND OF THE INVENTION

This invention relates to apparatus for stabilizing the oscillation frequency of a laser.

Various techniques for stabilizing the frequency of lasers have been proposed in the last several years. While a single-mode laser has a very narrow output frequency width, the actual oscillation frequency lies within a broad band of potential oscillation frequencies. Therefore, the actual oscillation frequency can shift because of environmental perturbations that affect the resonator of the laser, such as the positioning of its mirrors or the loss within the resonator.

For example, in my prior U.S. Pat. No. 3,575,668, issued Apr. 20, 1971 and assigned to the assignee hereof, I have implemented an advantageous arrangement for stabilizing the frequency of oscillation of a laser to the center frequency of the atomic resonance that provides the laser oscillation. This center frequency is also the center frequency of the band of potential oscillation frequencies. Nevertheless, such stabilization to the center frequency is subject to some uncertainty because the shape of the curve describing intensity of oscillation versus frequency for the band of potential oscillation frequencies near its peak is relatively broad and flat.

The resonance line of a gas is broadened by lifetime of the states, pressure effects, and Doppler broadening. The last-mentioned effect usually predominates. In the following we describe a method of overcoming the limitation of Doppler broadening and using the relatively narrow response of the lifetime--limited linewidth of a gas to provide a frequency standard to which a laser can be locked.

SUMMARY OF THE INVENTION

I have recognized that a laser can be frequency stabilized to a resonance of a gaseous frequency standard in a way that avoids the effects of Doppler broadening by passing a first component of the output beam through a gaseous frequency standard cell in a first direction and then detecting the first component, while a second component of the cell is passed through the cell in a second direction slightly less than 180° from the first direction by an amount sufficient to avoid subsequent interaction with the apparatus. The detected signal as a function of frequency has a narrow peak centered on the absorption line of the gaseous frequency standard. The width of this peak is the homogeneous linewidth of the absorbing gas, which is typically much narrower than the Doppler-broadened absorption line. This signal is applied through a feedback loop to control the tuning of the laser resonator.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENTS

The embodiments described here are based upon my recognition that a spectroscopic technique that I developed jointly with Mr. T. W. Hänsch can be modified and employed in the feedback control loop of a laser resonator. From that viewpoint, I have recognized that it is necessary to provide a frequency standard cell, preferably a low pressure gas cell, the properties of which are well known, to replace the unknown sample of the spectroscopic technique. That spectroscopic technique is described in an article by P. W. Smith et al. in Physical Review Letters, Vol. 26, beginning at page 740 (March 29, 1971).

Figure 1:
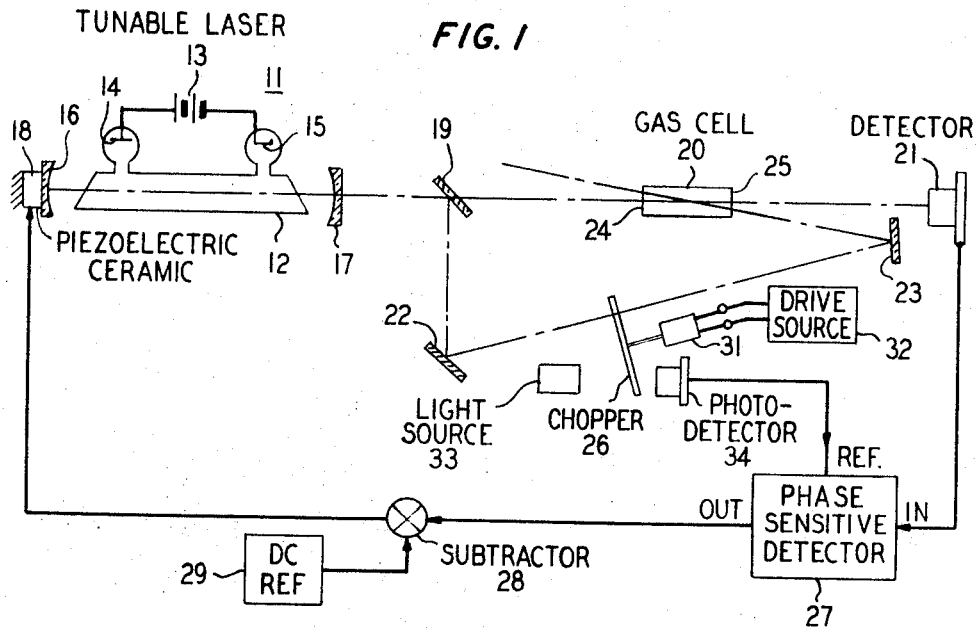
FIG. 1 is a partially pictorial and partially block diagrammatic illustration of a first embodiment of the invention.

In the embodiment of FIG. 1 the tunable single-frequency laser 11 includes the tube 12 containing a gaseous active medium such as a mixture of helium and neon, appropriately excited by a voltage source 13 through the anode 14 and cathode 15, and the optical resonator including the reflectors 16 and 17, the former of which is mounted on an axially movable piezoelectric ceramic crystal 18 to tune the laser 11.

The output of the laser is passed through a beam splitter 19, which passes a first component of the output beam in a first direction through the gaseous frequency standard cell 20 to the photodetector 21 and simultaneously directs a second component of the output beam via reflectors 22 and 23 to pass through cell 20 in a second direction slightly less than 180° from the first direction but deviating therefrom by an angle small enough that this second component still passes through the end windows 24 and 25 of cell 20 without distortion or occlusion. It also bypasses the beam splitter and avoids any subsequent interaction with the apparatus.

The gaseous frequency standard cell 20 is filled with a low pressure gas which has a well-defined absorption line occurring within the oscillation bandwidth of the laser 11.

Preferably, the second component of the output beam is chopped by a chopper 26. The chopper motor 31 may be driven by any suitable drive source 32, both being of known type. In general, a reference signal at the chopping frequency and of fixed phase relative to the second component of the coherent light may be derived by shining light from an auxiliary light source 33 through chopper 26 and detecting the chopped portion of it with an auxiliary photodetector 34. The output of photodetector 34 is the desired reference signal. The reference signal at the chopping frequency is fed into the reference input of a detector 27. The output of detector 21, corresponding to the detected remainder of the first component of the laser beam, is coupled to the signal input of phase sensitive detector 27. The output of the phase sensitive detector 27 is coupled to a subtracting amplifier 28 in which it is compared to a DC reference signal from a source 29. The output of subtracting amplifier 28 is applied to drive the piezoelectric ceramic crystal 18 in a sense that tends to compensate for deviations in the frequency of the laser in a manner that will be more fully explained below.

The operation of the present invention as a frequency stabilization circuit is based on the idea that the second component of the output beam passing through cell 20 from reflector 23 is absorbed by interaction with a particular velocity group of atoms in gaseous frequency standard cell 20 and that this absorption will have an effect on the absorption presented to the first component of the beam in cell 20, the specific effect depending on the displacement of the stabilized laser frequency from the center frequency of the natural resonance of the gas of cell 20. Further, the nearly opposite directions of propagation of the two components nearly cancel the effect of Doppler broadening upon the signal detected by photodetector 21.

The next step in my recognition of the new use of the above-described physical effect was the realization that this specific absorption effect can, in the final analysis, be converted by detector 21 and phase sensitive detector 27 to a voltage that is readily compared with the selectable voltage of a DC reference source 29.

If we take the simplest case in which the laser frequency is tuned to line center, then the second component of the beam, when present in cell 20, as permitted by chopper 26, will provide a much lower loss for the first component of the beam than exists at other times. This variation in the absorption presented to the first component of the beam yields a pulsed detected signal from detector 21 that has a fixed phase relationship with respect to the reference frequency signal from the photodetector 34.

The output signal from phase sensitive detector 27 is a DC voltage whose magnitude is proportional to the peak of the absorption of the gas in cell 20.

Figure 3:
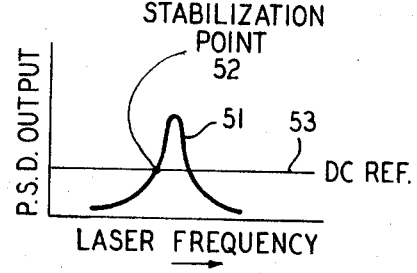
FIG. 3 shows a curve useful in explaining the operation of the invention.

In the more general case, as shown in curve 51 of FIG. 3, the establishment of a DC reference signal from source 29 that is less than the peak signal obtained when the laser is tuned to line center, will produce a stabilization point 52 that is displaced from the natural line center.

This relationship is best understood from curve 51 of FIG. 3 in which I have shown the laser frequency stabilized to one side of the response curve of the absorbing gas. When the laser oscillates off the center of the absorption line of the gas in cell 20, the first component of the output beam experiences increased loss in cell 20 due to a decreased absorption produced by the second component of the beam, inasmuch as the two components interact with somewhat differing velocity groups of atoms. Thus, the amplitude value detected at detector 21 will be reduced because of the increased absorption of cell 20. This reduction in detected signal occurs in a predictable correspondence with the offset of laser frequency from the peak of the absorption line of the gas in cell 20, as indicated in FIG. 3. Since stabilization occurs when the output of phase sensitive detector 25 is equal to the output of dc reference source 29, the voltage of the reference source 29 can be represented by a horizontal line 53 through point 52 in the plot of FIG. 3.

An appropriate theoretical description of absorption occurring in cell 20 can be made using a semiclassical model, describing the quantum state of atoms with velocity $v$ located at position $r$ at time $t$ statistically by an ensemble-averaged density matrix $\rho(r,v,t)$. The interaction with the two light fields in the dipole approximation can be introduced as a perturbation into the Hamiltonian. Cross-relaxation effects which redistribute atomic excitation in velocity space can be taken into account phenomenologically in the equation of motion obeyed by the matrix $\rho$.

Some physical processes which could contribute to cross relaxation are elastic atom-atom collisions, trapping of resonance radiation, and collisional atomic excitation exchange. Once the matrix $\rho$ is known for atoms of a given velocity $v$, the corresponding macroscopic polarization of the amplifying medium, and hence its gain and dispersion, can be obtained by averaging the expectation value of the electric dipole moment over the atomic velocity distribution. If we restrict our analysis to small light intensities, use a simple "strong-collision" model, and assume that the Doppler width $\Delta v_D$ is large compared with the pressure-broadened linewidth $\gamma$, the final result is the same as that expected from a simple "hole-burning" picture.

For the sake of simplicity we restrict our attention to this case. We start from the familiar rate equations for the population densities of the upper and lower laser levels $n_a(v)$ and $n_b(v)$, considered as functions of the axial atomic velocity $v$. In the absence of velocity-changing collisions, these equations may be written $$dn_a(v)/dt = \lambda_a(v) - \gamma_a n_a(v) - [I_1\sigma_1(v) + I_2\nu_2(v)][n_a(v) - n_b(v)],$$

(1)

$$dn_b(v)/dt = \lambda_b(v) - \gamma_b n_b(v) + [I_1\sigma_1(v) + I_2\sigma_2(v)][n_a(v) - n_b(v)],$$

(2)

where
$I_1 = (c/8\pi)|E_1|^2$ is the intensity of laser field 1,
and $$\sigma_1(v) = (4\pi/hc)(\gamma|\mu_{ab}|^2/[\gamma^2 + (\omega_{ab} - \omega_1 - k_1 v)^2])$$

(3)

Here $\mu_{ab}$ is the dipole moment of the transition, $\omega_{ab}$ is $2\pi\nu_{ab}$ where $\nu_{ab}$ is the resonant frequency of a stationary atom, and $\omega_1 = 2\pi\nu_1$ where $\nu_1$ is the frequency of the incident radiation field 1. Corresponding definitions hold for $I_2$ and $\sigma_2$. For the experiments reported here $k_1 = -k_2$ and $\omega_1 = \omega_2$. For the collisional excitation rates $\lambda$ we assume a Maxwellian velocity distribution, that is, $$\lambda_a(v) = \Lambda_a f(v), \quad \lambda_b(v) = \Lambda_b f(v); \quad f(v) = (\pi \bar{v})^{1/2} \exp(-v^2/\bar{v}^2).$$

(4)

Spontaneous and collisional decay processes for the upper and lower laser levels are described by the decay rates $\gamma_a$ and $\gamma_b$, respectively.

To allow for cross-relaxation effects we can modify the rate Equations (1) and (2) by adding to the right-hand side a term $$[dn_\alpha(v)/dt]_{x\text{-relax}} = -n_\alpha(v)\int \Gamma_\alpha(v',v)dv' + \int n_\alpha(v')\Gamma_\alpha(v,v')dv', \quad \alpha = a \text{ or } b.$$

(5)

The "collision kernel" $\Gamma(v,v')$ has to obey the principle of detailed balancing. We adopt a 'strong-collision" model by which we mean that the probability of finding the atom with velocity $v'$ after a cross-relaxation event is independent of the initial velocity $v$; that is, we set $$\Gamma_\alpha (v',v) = \Gamma_\alpha f(v'), \alpha = a \text{ or } b, \quad (6)$$

where $\Gamma_\alpha$ is a basic cross-relaxation rate characteristic of level $\alpha$. Thus, the cross-relaxation terms are simplified to $$[dn_\alpha (v)/dt]_{x\text{-relax}} = -\Gamma_\alpha n_\alpha(v) + \Gamma_\alpha f(v) \int n_\alpha(v')dv'. \quad (7)$$

We are interested in the perturbations $\Delta n_\alpha(v) = n_\alpha(v) - [n_\alpha(v)]_I = 0$ of the population densities $n_\alpha$, $\alpha = a$ or $b$, caused by the saturating field $I_1$. Assuming small light intensities and considering only steady-state solutions, we obtain $$\Delta n_a(v) = -\frac{I_1(N_a^0 - N_b^0)f(v)}{\Gamma_a + \gamma_a} \left[\sigma_1(v) + \frac{\Gamma_a}{\gamma_a} \int \sigma_1(v')f(v')dv'\right], \quad (8)$$

where $N_\alpha^0 = \Lambda_\alpha/\gamma_\alpha$; $\alpha = a$ or $b$. Starting from Equation (2) we obtain corresponding results for $\Delta n_b$ with $a$ and $b$ interchanged. Obviously, the first term in the square brackets gives the Lorentzian "hole," that is, the inhomogeneous saturation of the population density, whereas the second term describes a Gaussian background to the cross relaxation.

The corresponding change of the probe-field transition rate, that is, the measurable signal $S$, can now be calculated $$S \equiv \Delta \int I_2 \sigma_2(v)[n_a(v) - n_b(v)]dv = -I_2 I_1 (N_a^0 - N_b^0) \cdot \{[(1/\Gamma_a + \gamma_a) + (1/\Gamma_b + \gamma_b)] \int f(v)\sigma_1(v)\sigma_2(v)dv + [\Gamma_a/\gamma_a/\Gamma_a + \gamma_a) + (\Gamma_b/\gamma_b/\Gamma_b + \gamma_b)] \int f(v)\sigma_1(v) dv \int f(v)\sigma_2(v)dv\}. \quad (9)$$

The integrals can be evaluated by means of the tabulated plasma dispersion function. In the limit $\Gamma/\Delta\omega_D \ll 1$, where $\Delta\omega_D = |k|v = 2\pi\Delta\nu_D$, and with the definition $|v_1 - v_{ab}| = \Delta v$, we obtain $$S = -I_1 I_2 (N_a^0 - N_b^0) \left(\frac{\pi}{c\hbar}\right)^2 |\mu_{ab}|^4 \frac{8}{\pi^{1/2}\Delta\nu_D} \left\{\left[\frac{1}{\Gamma_a + \gamma_a}\right.\right.$$
$$+ \left.\frac{1}{\Gamma_b + \gamma_b}\right] \frac{\gamma}{\gamma^2 + (2\pi\Delta\nu)^2} \exp\left(\frac{-\Delta v^2}{\Delta v_D^2}\right) + \left[\frac{\Gamma_a/\gamma_a}{\Gamma_a + \gamma_a}\right.$$
$$+ \left.\frac{\Gamma_b/\gamma_b}{\Gamma_b + \gamma_b}\right] \frac{1}{2\pi^{1/2}\Delta\nu_D} \exp\left[\frac{-2(\Delta v)^2}{\Delta v_D^2}\right]\right\}. \quad (10)$$

We see, then, that with these approximations the measured signal consists of a peak of width $\approx \gamma/2\pi$ and a wide Gaussian background. The natural or homogeneous linewidth, $\gamma/2\pi$, can be made very narrow by selecting a suitable low pressure absorbing gas. The essential advantage of this technique is that the signal depends only on the narrow homogeneous linewidth of the frequency standard absorbing gas transition, and not on the much broader Doppler width.

In the embodiment of FIG. 1, it is necessary to stabilize the laser on one side of the resonance of the absorbing gas. In order to stabilize to the peak of this resonance line, the embodiment shown in FIG. 2 can be used. By dithering the laser output frequency with the audio oscillator 39, and detecting the output of phase sensitive detector 27 at this dither frequency, it is possible to obtain a response of phase sensitive detector 40 which is the derivative of the curve shown in FIG. 3, the response providing a discriminant curve with a null at the center of the resonance line. Thus, the output of phase sensitive detector 40 can be used to stabilize the laser. Note that for this embodiment it is necessary for the frequency of the oscillator 39 to be low enough so that the period is longer than the response time (integrating time) of the phase sensitive detector 27.

Figure 2:
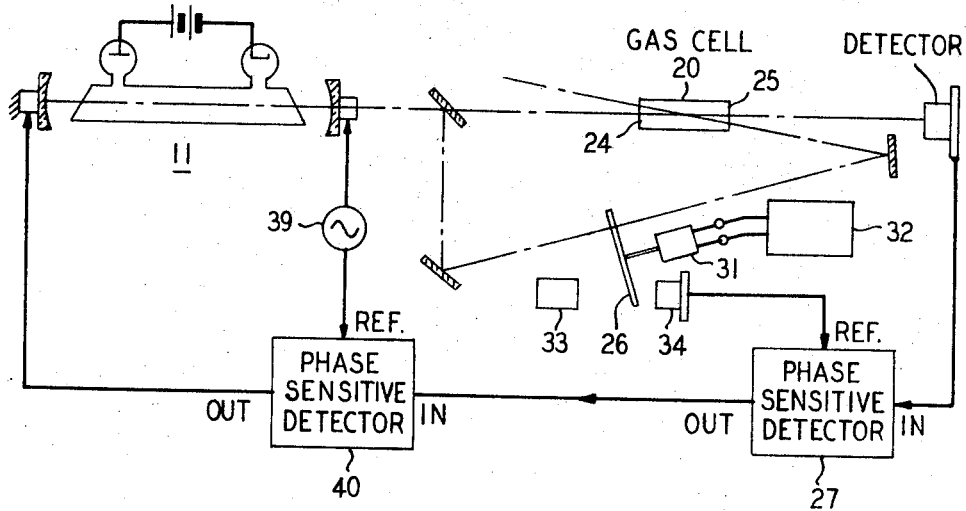
FIG. 2 shows a modification of the embodiment of FIG. 1 in which the laser frequency is dithered.

In all other respects, the embodiment of FIG. 2 is like that of FIG. 1.

In one illustrative system according to my invention, the gaseous frequency standard cell 20 comprises a cell having transparent end windows 24 and 25 and containing an absorbing gas at relatively low pressure, as compared to the pressure of the laser. Specifically, I suggest that a pressure of 0.5 Torr of neon be employed in cell 20 for use with a helium-neon laser 11 and that the gas be subjected to a low level discharge (by means not shown). For example, in a cell 20 that is 5 millimeters in diameter and 10 centimeters long, the discharge current might be 2 milliamps from a direct current source.

I claim:

1. Apparatus for frequency stabilizing a laser, comprising a laser including a tunable resonator that permits the emission of an output beam of coherent radiation therefrom, a frequency standard cell containing a gaseous medium having an absorption within the output bandwidth of said laser, means including a beam splitter for passing a first portion of said beam through said cell in a first direction, means for passing a second portion of said beam through said cell in a second direction slightly less than 180 degrees from said first direction, the means for passing the second portion of the beam through the cell including means for chopping said second portion, means for detecting the first portion of the beam after passage through said cell, and means responsive to said detecting means for tuning said resonator to stabilize a parameter of the detected first portion, the means for tuning the resonator comprising means for generating first and second reference signals, the first reference signal being chopped at the chopping rate of said second portion of said beam and having a fixed phase relative thereto, phase sensitive means for detecting a difference between the first reference signal and the detected first portion, means for comparing a signal responsive to said difference to the second reference signal, and means responsive to said comparing means for applying a correction signal to tune the resonator to tend to make the compared difference signal equal to said second reference signal.

2. Apparatus according to claim 1 in which the cell comprises end windows transparent at the oscillation frequency of the laser and in which the means for passing the second portion of the beam through the cell includes a plurality of reflectors disposed to avoid intercepting the first portion of the beam while directing said second portion through the end windows of the cell without intercepting the beam splitter.

* * * * *